United States Patent [19]

Queiser et al.

[11] 4,274,962

[45] Jun. 23, 1981

[54] APPARATUS FOR TREATING RADIOACTIVE CONCENTRATES

[75] Inventors: Horst Queiser, Maintal; Othmar Meichsner, Raunheim, both of Fed. Rep. of Germany

[73] Assignee: Kraftwerk Union Aktiengesellschaft, Mühlheim, Fed. Rep. of Germany

[21] Appl. No.: 655,249

[22] Filed: Feb. 4, 1976

[30] Foreign Application Priority Data

Apr. 11, 1975 [DE] Fed. Rep. of Germany ....... 2515795

[51] Int. Cl.[3] ............................................ C02F 9/00

[52] U.S. Cl. ......................... 210/257.1; 252/301.1 W; 366/184

[58] Field of Search ........................ 210/24 R, 38 C, 42, 210/59, 66, 67, 68, 73 R, 152, 198 R, 205, 170, 202, 257 R; 252/301.15, 301.1 W; 423/2, 6; 259/154; 366/184; 422/159

[56] References Cited

U.S. PATENT DOCUMENTS

| | | | |
|---|---|---|---|
| 3,093,593 | 6/1963 | Arrance | 210/24 R |
| 3,513,100 | 5/1970 | Stogner | 252/301.1 W |
| 3,773,177 | 11/1973 | Queiser et al. | 210/68 |
| 3,883,441 | 5/1975 | Murphy et al. | 252/301.1 W |
| 3,966,175 | 6/1976 | Stock et al. | 259/154 |

FOREIGN PATENT DOCUMENTS

| | | | |
|---|---|---|---|
| 1109279 | 6/1961 | Fed. Rep. of Germany | 252/301.1 W |
| 1771244 | 12/1971 | Fed. Rep. of Germany . | |
| 40837 | 9/1965 | German Democratic Rep. . | |

OTHER PUBLICATIONS

*Waste Management Abstracts* No. 4, 1968, pp. 69–76, International Atomic Energy Agency, Vienna.

*Primary Examiner*—Charles N. Hart
*Assistant Examiner*—Peter A. Hruskoci
*Attorney, Agent, or Firm*—Spencer & Kaye

[57] ABSTRACT

An apparatus is provided for treating various radioactive concentrates having a liquid component, such as suspensions and salt solutions, which are present separately in a processing plant from evaporation systems, resin bead ion exchange filters, and from at least one further separating stage provided with, for example, mechanical filters, sedimentation basins and/or powdered resin ion exchange filters. The filter concentrates containing suspended solids are dewatered in a filter cake-producing filter and the concentrates from the evaporation system (salt solutions) are dewatered wholly or in part directly in transporting and storage drums to the dryness required for storage. At least one of the various concentrates are at least for a time conducted directly (without dewatering) into a storage drum where they are mixed with binders and converted to solids by hardening.

6 Claims, 3 Drawing Figures

APPARATUS FOR TREATING RADIOACTIVE CONCENTRATES

BACKGROUND OF THE INVENTION

The present invention relates to an apparatus for treating various radioactive concentrates having a liquid component, such as suspensions and salt solutions, which are separately produced in a nuclear processing system from evaporation processes, resin-bead ion exchange filters and at least one further separating stage including, for example, mechanical filters, settling basins and/or powdered resin ion exchange filters.

In nuclear plants, particularly nuclear power plants, waste water which contains impurities is present at many places. These impurities must be removed from the waste water before the waste water can be recirculated or before it can be discharged to the environment. These impurities are usually radioactive and are either bound to solid components contained in the water or to ionically dissolved substances. The plant which treats such waste water is called a waste water processing plant system, or simply, a processing plant. Such waste water processing plants, are described, for example, in *Atomwirtschaft,* 1968, page 149, FIG. 6; in an article entitled "Abfallbehandlung" (in translation—WASTE TREATMENT) which appeared in *Atomwirtschaft,* November 1965, pages 624–626, especially paragraph 2 of page 626; and in the collection "Power Plant and Environment 1973", published by VGB—Technische Vereinigung der Grosskraftwerksbetreiber e.V. (in translation—ASSOCIATION OF OPERATORS OF LARGE POWER PLANTS).

From these water-processing plants and other cleaning operations large amounts of radioactive concentrates arise. Concentrates in this connection are understood to mean the slurries obtained in all water purification systems of nuclear power plant components.

Sources of such concentrates are the various systems for coolant purification, the storage basin water purification and the waste water processing system. The concentrates are present in the form of spent filtering aids and ion exchangers from the filtering systems and as salt solutions from the evaporation systems used to remove the contaminants and radionuclides from the water. Depending on the size of the nuclear reactor plant, the quantities involved are between about 10 to 20 $m^3$ per month.

For economical reasons, and as described, for example, in the article "Abfallbehandlung" in the November, 1965 issue of *Atomwirtschaft*, processing of radioactive liquid wastes, for instance those occurring in nuclear power plants, is usually effected in three processing lines:

1. Filtration through mechanical filters with the filtrate being then passed through ion exchangers;
2. Concentration in evaporators;
3. Filtration only through mechanical filters.

The first-listed processing line is used for the waste waters from the nuclear cooling system and from the condensation system (these waters make up 60% to 70% of the total waste water load).

The second-listed processing line is used for sump waters, laboratory waste waters, and decontamination waters from the entire control region (about 20% to 30% of the total waste water load).

The third-listed processing line is used for cleaning wash waters from washing machines, showers, and hand-washing basins, as well as inactive laboratory waters from the control region (about 5% to 10% of the total waste water load).

Efficient service organizations for collecting and treating the various concentrates do not exist. A storing of these concentrates in liquid form is presently not possible. The storing of these concentrates for the purpose of allowing radioactive decay to run its course requires considerable capital expense, especially where waste quantities are large, such as in the case of large power plants. It therefore becomes worthwhile to dewater and solidify such concentrates.

The method of solidifying the radioactive residues in the power plant is often used to treat the concentrates until they achieve a form which can be permanently stored. In boiling water reactors, for example, the solidification is effected mainly by water removal and drying processes.

A solidification process effected mainly by water removal and drying is described in U.S. Pat. No. 3,773,177 which is hereby incorporated by reference. In the process described in the above patent, various concentrates are initially separated into three groups, depending on their type and activity, and are placed in separate containers holding filter concentrates, ion exchange resin concentrates and evaporation concentrates. The concentrates in the filter concentrate containers and ion exchange resin concentrate containers are further concentrated by means of sedimentation of the solids and decanting of the water; are mixed together, if required; and then water is removed from them in a filtering process which produces a filter residue and the filter residue is then dried with hot air. The resulting filter residues are then conducted into storage containers. The highly salt containing concentrates from the evaporation system collected in the evaporator concentrate containers are directly introduced into a final transport and storage vessel where they and dried to the dryness required for storage by external heating of the vessel during filling until a solid block of salt is obtained.

The process described in U.S. Pat. No. 3,773,177 is based on processing all filtrable and salt-poor concentrates by filtering them on a filter-cake-producing filter to form a filter residue which can be dried with the aid of the filter. Thus, it is necessary only to treat the relatively small amounts of concentrate from the evaporation stage by further evaporation under heat which involves expenditures for energy. The feeding of the concentrate from the evaporation concentrator onto the filter-cake-producing filter is not advisable because the high salt content in the concentrate from the evaporation concentrator would enable radioactivity bound to dissolved substances to not be removed and would cause the filtrate to achieve such a high salt content that it could not be recirculated without additional expensive further processing to reduce this high salt content.

SUMMARY OF THE INVENTION

It is a primary object of the present invention to improve the known process of treating radioactive concentrates so that the concentrates and filter residues can be fixed to a binder directly in the final storage container with simultaneous dilution of the radioactive substances and shielding of the radiation.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects, and in accordance with its purpose, the present invention, as embodied and broadly described, provides an apparatus for treating various radioactive concentrates having a liquid component (suspensions, salt solutions), which concentrates are present separately in a nuclear processing plant from evaporation systems, resin bead ion exchange filters and from at least one further separating stage having, for example, mechanical filters, sedimentation basins and/or powdered resin ion exchange filters, comprising dewatering the filter concentrates containing suspended solids in a filter-cake-producing filter, dewatering, the concentrates from the evaporation system, wholly or in part, directly in a transporting and storage drum to the dryness required for storage, and conducting at least one of the various concentrates, at least in part and at least for a time, directly without dewatering, into a storage drum where it is mixed with binders and converted to solids by hardening.

In addition to the technical advance realized by the solution of the present invention, the invention has the further advantage that part of the concentrates and/or residues is initially fixed to a binder directly in the final storage drum with simultaneous dilution of the radioactive substances. This also produces a great internal shielding effect to reduce the radiation dose energy at the outside of the drum.

In preferred embodiments, the present invention, as will be explained below, enables the storage drum capacity to be utilized better. Further, in the practice of the present invention, the liquid to solid ratio in the individual concentrates can be set and various concentrates can be mixed with each other to set the overall liquid to solid ratio of the concentrate added to the storage drum. In addition, the concentrate to binder ratio can be set. The setting of these ratios makes it possible to obtain a desired or permissible radiation dose energy value in the storage drum.

It is to be understood that both the foregoing general description and the following detailed description are exemplary and explanatory, but are not restrictive of the invention.

BRIEF DESCRIPTION OF THE DRAWINGS

The accompanying drawings, in which like numbers indicate like parts, illustrate examples of presently preferred embodiments of the invention and, together with the description, serve to explain the principles of the invention.

Of the drawings.

DETAILED DESCRIPTION OF PREFERRED EMBODIMENTS OF THE INVENTION

Figure 1:
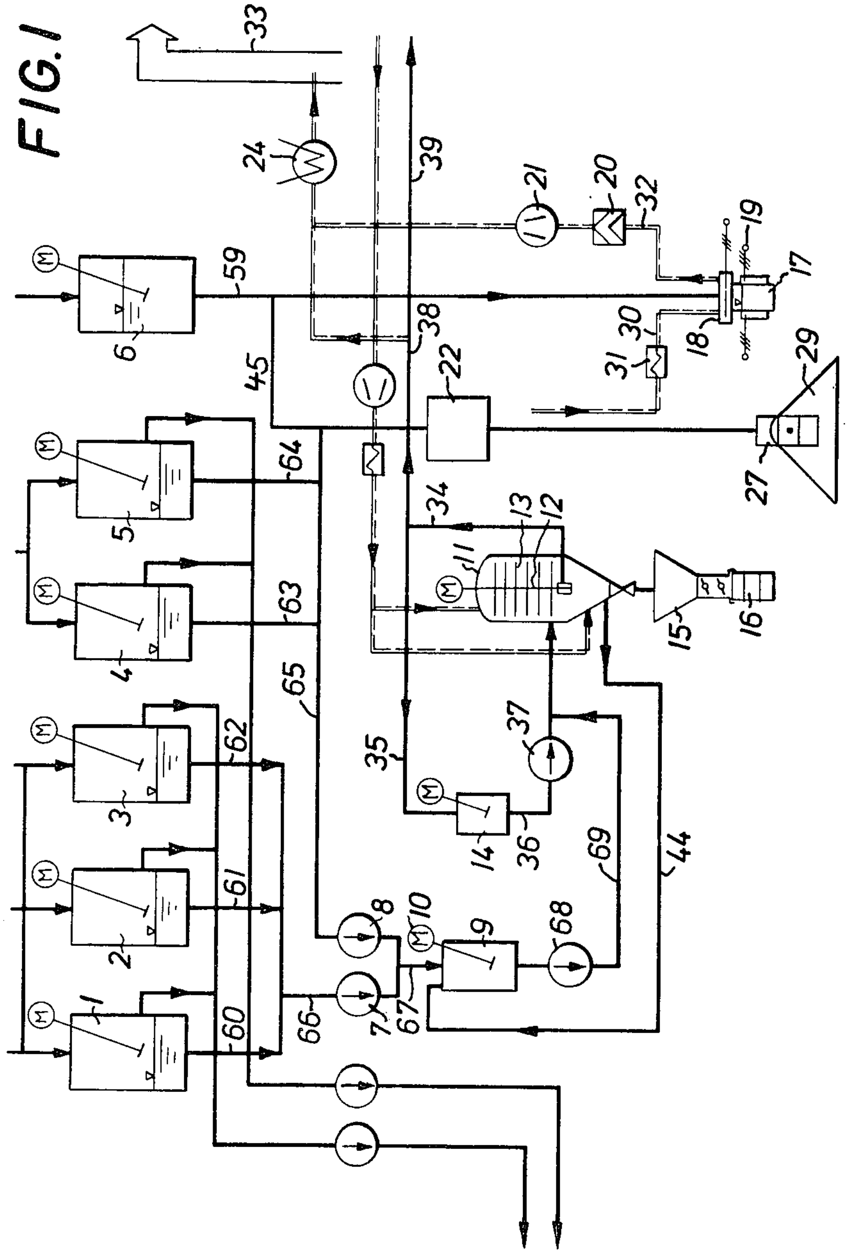
FIG. 1 shows a schematic circuit diagram for a process conducted in accordance with the teachings of the present invention.

Referring to FIG. 1, there are shown filter concentrate containers 1 to 5 in which the concentrates or slurries from various filtering systems of the power plant are collected. These concentrates can include, for example, those coming from reactor water purification, condensate purification, storage vessel purification and waste water purification. For example, container 1 can carry concentrates resulting from condensate cleaning, which concentrates generally contain a powdered resin ion exchanger. Container 2 can collect concentrates resulting from mechanically filtering the wash waters coming from the entire control region. Container 3 can collect a resin-bead concentrate from mixed bed ion exchange filters. Containers 4 and 5 are intended primarily for receiving concentrate containing the higher activity ion exchange resins, generally powdered resins, resulting from the cleaning and purification of the reactor water. Container 6 collects the concentrate having a high salt content from an evaporation concentrator of the evaporation system of the waste water processing system, as contrasted with containers 1 to 5 whose concentrates result from filtering operations.

Exemplary data concerning the concentrate compositions of the various containers is given in Tables I to III of U.S. Pat. No. 3,773,177, where containers 1 to 6 of that patent correspond to containers 1 to 6, respectively, of the present specification. U.S. Pat. No. 3,773,177 is hereby incorporated by reference.

The concentrates in containers 1, 2, 4 and 5 generally have a salt content lower than that of the concentrate in container 6 and particles of a size smaller than the particle size of the resin-beads in container 3.

The concentrates of containers 1 through 5 can be fed to an intermediate storage container 9 through pipelines 60 to 67 by concentrate pumps 7 and 8. Pipelines 60 to 64 include individually controllable valves (not shown) so that any desired mixture of the concentrates in containers 1 to 5 can be obtained in container 9.

A stirrer 10 preferably is provided to mix the concentrates fed into container 9. From container 9, the resulting mixture is fed through pipeline 69 by pump 68 to a filter-cake-producing filter 11. This filter 11 is made of a number of plate-shaped elements 13 carried by a vertical, hollow shaft 12. Filter cake forms on the upper sides of the plates. The filtrate is drawn off through the hollow shaft 12 and pipelines 34, 38 and 39 and drained into storage vessels or passed to further water treatment and then recycled, generally to the coolant reservoir.

An example of filter 11 is a steam heated filter obtainable under the designation "Funda-Rueckstandsfilter" R10 from Chemap AG, Maennedorf/Zuerich, Alte Landstr. 414. Another example of filter 11 is that described on pages 19–72 and 19–73 of "Chemical Engineers' Handbook", by John H. Perry, McGraw-Hill Book Co., New York (4th Ed., 1963) under the heading "The Rodney Hunt Pressure Filter".

"Filter-cake-producing filters" is used herein to distinguish from those filters which operate exclusively by ion-exchange capture of the substance to be filtered out. In order to prevent radioactive solids from getting into the filtrate, filter 11 is first provided with a filtering aid in the form of a precoat of fibrous material, such as cellulose fiber, before actual filtration begins. To this end, there is provided a precoat tank 14 connected in an auxiliary circuit. The fibrous material is first thoroughly mixed with water in the precoat tank; then this fiber-laden water is pumped by pump 37 into filter 11 while a suction is being applied to shaft 12, whereby the precoat is formed on the filter cloths or Septa of the elements 13. An example of a suitable fibrous material is clean, fibrous cellulose material designated as Type BW 100 (cotton fibers of 1 millimeter length). During drying, this cotton fiber precoat gives an effect equal to a paper filter and acts to filter out aerosols.

Preferably, the cotton fibers are added to water in tank 14 until they amount to 3 to 4 weight-percent of the weight of the water. A homogenizing period during which the filter-water mixture is circulated through the filter and the precoat tank via pipelines 34, 35 and 36 by pump 37 assures a uniform precoat layer thickness of about 0.8 millimeters.

When an economical filter cake load has been built up on elements 13, any remaining unfiltered slurry remaining in filter 11 is circuited back to container 9 through pipeline 44 and dewatering and drying of the filter cake is then carried out, preferably as described in the above-noted U.S. Pat. No. 3,773,177.

The dried filter cake is removed from elements 13 by rotating shaft 12 by means of motor M. The filter cake is flung centrifugally from the elements 13. Below filter 11 there is a residue bunker or bin 15 through which the dried filter cake from the filter 11 is conducted into containers 16.

The relatively small volumes of concentrate coming into container 6 from the evaporation concentrator are conducted directly from container 6 through pipeline 59 into transport and storage containers 17 which are heated through an electrical terminal 19. The concentrate flow from container 6 is stopped when a level indicator (not shown) indicates that a predetermined concentrate level has been achieved.

A hood 18 is disposed above container 17 and contains infrared radiators which heat the concentrate in container 17 from above. Air flow within the hood is controlled so that the air passes over the liquid surface of the concentrate and withdraws vapor as it is produced by the radiators. Maintenance of the air flow within the hood and over the surface of the concentrate makes the hood and container interior have a negative pressure, so that no vapors can escape through any leaks at the connection between hood and container. When no liquid level remains, a post drying period preferably is initiated to bring the moisture down to less than 30 weight-percent of the total weight of dry residue. This moisture content enables the filled container to be stored for years without developing leakages.

Air flow through hood 18 comes in from conduit 30 and has been heated by heater 31. Exhaust air laden with vapor leaves through conduit 32. The exhaust air is passed through a combined cyclone/sand filter unit 20 to remove any solid or liquid particles and is then forwarded by airtight blower 21. The exhaust air then passes through dry air coooler 24, where any condensable components are removed, and thence to exhaust chimney 33 and into the reactor air. Condensate and rinse water from the cyclone/sand filter are returned to container 6. Thus, the vapors produced from heating of the concentrates in container 17 are conducted into the reactor air while, as previously mentioned, the much larger quantity of purified waste water is removed from residue filter 11 for further processing of the water and is then returned to the coolant reservoir.

Since the concentrate resulting from cleaning the reactor water often exhibits higher radioactivities, special containers are provided for their collection. At least two containers 4 and 5 are always provided, so that alternatingly one and then the other can be filled. This allows an optimum storage time to be selected for allowing radioactive decay to proceed partially before the concentrates are forwarded to container 9 from the container 4 or 5 which at the moment is not being filled.

Figure 3:
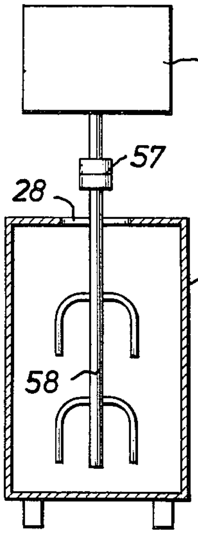
FIG. 3 is a front elevational view of a stirring mechanism made in accordance with the teachings of the present invention.

The resin slurries concentrated in containers 4 and 5 are dried, in the manner described above, as long as they are still in the weakly active range as indicated, for example, by an activity of less than about 20 ci/$m^3$ when the slurries concentrated in containers 4 and 5 are from light water nuclear power plants and are to be disposed of in 200-liter storage containers 16, via filter-cake-producing filters 11. If, however, the concentrates in containers 4 and 5 lie in the higher activity range, such as, for example, an activity of greater than about 20 ci/$m^3$ when the slurries are from light water nuclear power plants, the pre-concentrated ion exchange resin concentrates in containers 4 and 5 are not conducted to 200-liter storage containers 16 via filter-cake-producing filters 11, but instead are conducted via a metering vessel 22 directly into a final transport storage drum 27, which has previously been partially filled with a binder. In this drum 27, the concentrates and binder are mixed in mixing centrifuge 29, harden and simultaneously form a block. Instead of using a mixing centrifuge 29, it is also possible to mix the binder and concentrate with a stirring mechanism, generally 56, as shown in FIG. 3. Stirring mechanism 56 can be provided with a disposable agitator 58 which can be severed from the remainder of the stirring mechanism 56 and left in storage drum 27 after the stirring process has been completed. For this purpose, an easily releasable or severable connection 57 is provided between the main body of stirring mechanism 56 and agitator 58.

The binder that is introduced into storage drum 27 can be cement. Other binders, such as, for example, formaldehyde, can also be used. When using cement as a binder, the mixing ratio of cement to water necessary to bring about the setting of the cement generally is about 2.5:1, and this water is provided by the water in the various concentrates that are added to storage drum 27.

Preferably, the binder that is introduced into storage drum 27 is packed in one or a plurality of smaller and easily destroyed binder containers. Upon completion of the filling process, the storage drum 27 is closed and is caused to move to produce destruction of the binder containers and mixing of the binder and concentrate.

The binder containers may be bags, boxes, capsules or sacks. Preferably, small, heavy objects are introduced into storage drum 27 before addition of the radioactive residues to enhance mechanical destruction of the binder containers as well as the mixing of the binder with the concentrate. Flintstones have been found to be especially suitable for use as small, heavy objects. The binder container that is introduced into storage drum 27 can be chemically decomposed. For example, the binder containers can be made of a wood fiber paper, and upon addition of water, these binder containers are dissolved and then finely dispersed in small scraps during centrifuging.

In order to produce an optimum mixing ratio in storage drum 27, the appropriate binders are measured out and the water-to-solid ratio is set in the concentrate. For this purpose, concentrate containers 4 and 5 are provided and, if required, a measuring vessel 22 connected in series therewith. Containers 4 and 5 are sedimentation tanks and it is possible to control the amount of sedimentation within them to thereby control the water-to-solid ratio in the concentrate. The water-to-solids ratio in the other collecting containers can similarly be controlled. The mixing ratio of concentrate with binder can also be influenced by mixing the various types of concentrates from the other collecting containers 1 to 3 and 6 with the concentrate from containers 4 and 5 via connections which are not shown in the schematic illustration.

The amount of concentrate that is mixed with the binder depends on which activity and activity composition the concentration has, what dose energy is desired in storage drum 27, and on certain values which depend on the concentrate involved. These certain values are determined by the setting capability of the binder and concentrate mixture and the resulting hardness. For example, with evaporator concentrates from container 6, and cement as a binder, about 20 kg of concentrate, calculated on a dry basis, preferably can be added to a 200-liter storage drum 27. When using powdered resin concentrates such as, for example, from containers 4 and 5, about 10 kg of concentrate, calculated on a dry basis, preferably can be added to a 200-liter storage drum 27. As described in greater detail below, when using a 200-liter storage drum 27, a total of about 165 kg of cement binder can be used plus the water necessary to bring about the setting of the cement, which water comes from the concentrates.

Exemplary data concerning the solid-to-water ratio of the concentrates and the concentrate compositions of the containers is given in Tables I to III of the U.S. Pat. No 3,773,177.

In an advantageous embodiment of the process of the present invention, the concentrates and the corresponding binders are introduced into storage drum 27 in stages, alternating with the hardening process, until the storage drum 27 is filled substantially. With this process, the volume of storage drum 27 can be better utilized because hardening always results in a certain reduction of volume. In the mode of operation in which the storage drum 27 is moved to bring about mixing of the binder and concentrate, it is necessary, after addition of the appropriate binders, and introduction of the concentrates into the storage drum 27, to close storage drum 27 to set it into motion. After hardening, storage drum 27, whose contents now occupy a smaller volume, is opened and a new incremental addition of binder and concentrate can be initiated. For example, the initial incremental filling of binder and concentrate can be conducted to fill storage drum 27 to about two-thirds of its volume after setting and hardening of the mixture of binder and concentrate. A second incremental filling with binder and concentrate can then be conducted to fill storage drum 27 to about eight-ninths of its volume after setting and hardening, and this degree of fill generally is sufficient for the purposes of the present invention. Generally, 5 kg bags of cement can be used in the filling of storage drum 27, with a total quantity of 130 kg cement being added during the first incremental fill and a total quantity of 35 kg cement being added during the second and final incremental filling of a storage drum 27 of 200 liters.

The possibility of influencing the concentration ratios from the various containers 1 to 6 and of the concentrate to binder ratio provides a way to easily set the radiation dose energy in storage drum 27 to a desired or permissible, respectively, value.

In a particularly favorable embodiment of the process of the present invention, the ion-exchange filter concentrates are initially mixed with the slurries with high salt content from the evaporator concentrate vessel 6 in container 9. Line 45 can be used to transfer the slurries from evaporator concentrate vessel 6 to container 9. The resulting salt-free water then may be separated by filtering and then may be reused. With this mode of operation, the in-drum drying system 17 to 19 can be relieved or eliminated if this mode of operation is used frequently.

If the dried residues from bunker 15 are to be introduced into storage drum 27, drum 27 preferably is conveyed by a transporting device from the concentrate measuring station to bunker 15.

Figure 2:
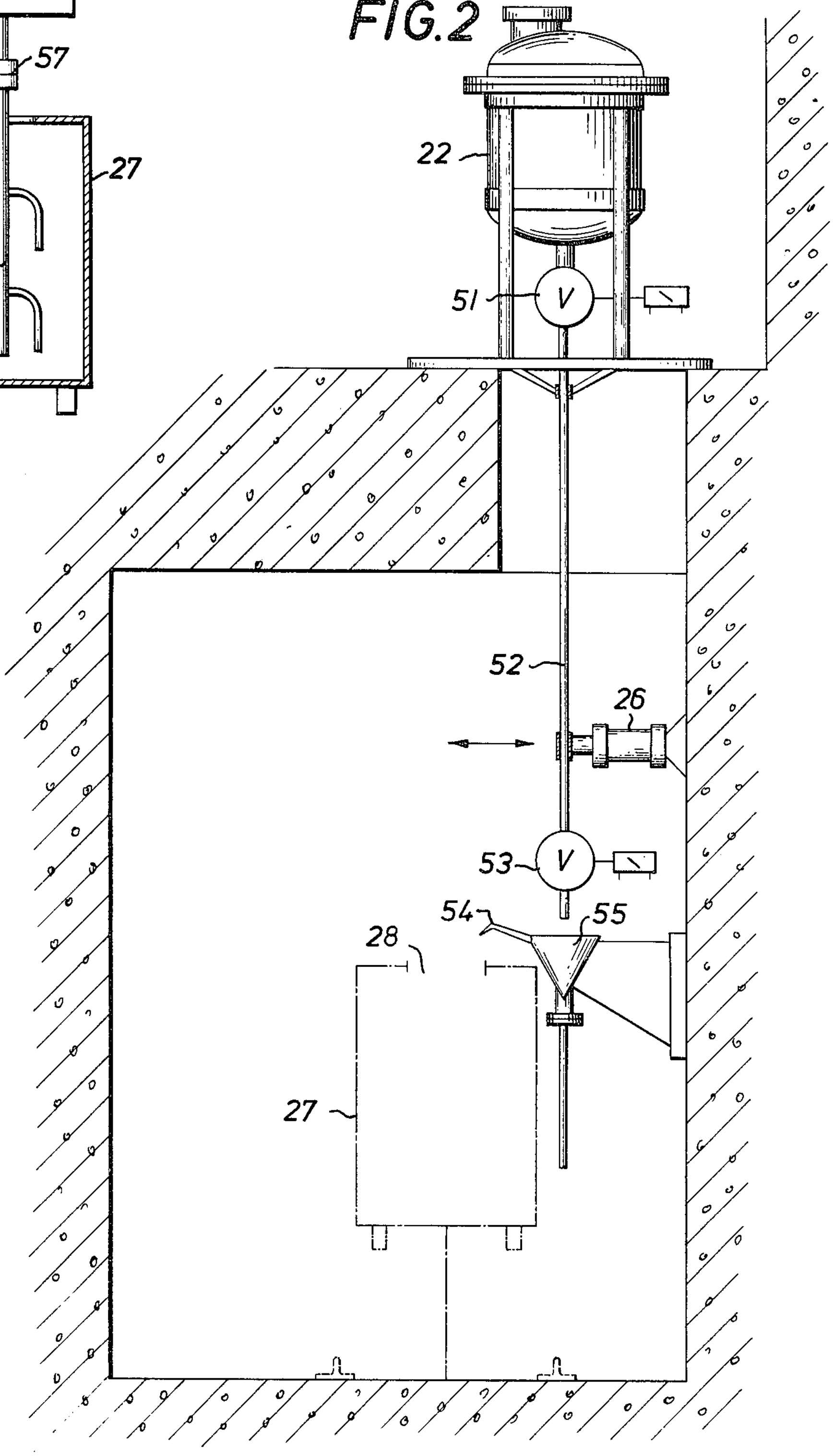
FIG. 2 is a front elevational view of a filling device made in accordance with the teachings of the present invention.

In order to assure proper filling into storage drum 27, an advantageous embodiment of the apparatus provides that a filling device be connected to metering vessel 22, as illustrated in FIG. 2. The fill device includes a movable fill pipe 52 having two blocking valves, 51 and 53. Fill pipe 52 is actuated by a lifting cylinder 26 which is able to move fill pipe 52 from its rest position over a collecting vessel 55 to its fill position over storage drum 27. Collecting vessel 55 is positioned adjacent the fill opening 28 and is provided with a stripping edge 54 which is disposed between the fill opening 28 of storage drum 27 and the opening of collecting vessel 55 so that it is assured that during movement of fill pipe 52 away from fill opening 28 of storage drum 27, the opening of fill pipe 52 is always over collecting vessel 55.

It will be understood that the above description of the present invention is susceptible to various modifications, changes and adaptations, and the same are intended to be comprehended within the meaning and range of equivalents of the appended claims.

What is claimed is:

1. Apparatus for treating various radioactive concentrates having a liquid component: including a plurality of filter concentrate containers, an evaporator concentrate container, an intermediate storage container connected to the filler concentrate containers and to the evaporator concentrate container, a filter-cake-producing filter connected to the intermediate storage vessel for receiving concentrate therefrom, a storage drum having a fill opening and being connected to the filter concentrate containers and evaporator concentrate container via a metering vessel, a filling device between the storage drum and metering vessel for filling the storage drum, said filling device comprising a movable fill pipe, and a collecting vessel below the fill pipe and next to the fill opening in the storage drum, said movable fill pipe being movable between said collecting vessel and the fill opening in the storage drum.

2. The apparatus as defined in claim 1 including a mixing centrifuge to effect mixing and stirring of the storage drum.

3. The apparatus as defined in claim 1 including a bunker for receiving dried filter residue from the filter-cake-producing filter and a transporting device for transporting the storage drum to the bunker.

4. The apparatus as defined in claim 1 wherein the collecting vessel is provided with a stripper edge which extends between the fill opening of the storage drum and the opening of the collecting vessel.

5. The apparatus as defined in claim 1 including a stirring mechanism for mixing the contents of the storage drum.

6. The apparatus as defined in claim 5 wherein the stirring mechanism operates with a disposable stirrer.

* * * * *